(12) United States Patent
Kain

(10) Patent No.: US 6,428,099 B1
(45) Date of Patent: Aug. 6, 2002

(54) CHILD VEHICLE SEAT WITH ADJUSTABLE AND REMOVABLE BASE

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/614,078

(22) Filed: Jul. 11, 2000

Related U.S. Application Data

(60) Provisional application No. 60/143,309, filed on Jul. 12, 1999.

(51) Int. Cl.[7] .............................. B60N 2/26; A47C 1/08
(52) U.S. Cl. .............................. 297/256.1; 297/256.13; 297/256.16; 297/250.1
(58) Field of Search .................... 297/256.1, 256.13, 297/256.16, 250.1

(56) References Cited

U.S. PATENT DOCUMENTS

| | | | |
|---|---|---|---|
| 3,649,074 A | * 3/1972 | McDonald et al. | 297/153 |
| 4,058,342 A | * 11/1977 | Ettridge | 297/256.13 |
| 4,205,877 A | 6/1980 | Ettridge | |
| 4,215,900 A | * 8/1980 | Coult | 297/254 |
| 4,231,612 A | 11/1980 | Meeker | |
| 4,345,791 A | 8/1982 | Bryans et al. | |
| 4,348,048 A | 9/1982 | Thevenot | |
| 4,500,133 A | 2/1985 | Nakao et al. | |
| 4,545,613 A | 10/1985 | Martel et al. | |
| 4,545,617 A | 10/1985 | Drexler et al. | |
| 4,613,188 A | 9/1986 | Tsuge et al. | |
| 4,632,456 A | * 12/1986 | Kassai | 297/328 |
| 4,634,177 A | * 1/1987 | Meeker | 297/256.13 |
| 4,681,368 A | 7/1987 | Heath et al. | |
| 4,707,024 A | 11/1987 | Schrader | |
| 4,709,960 A | 12/1987 | Launes | |
| 4,733,909 A | 3/1988 | Singles, II et al. | |
| 4,754,999 A | * 7/1988 | Kain | 297/256.14 |

(List continued on next page.)

Primary Examiner—Peter M. Cuomo
Assistant Examiner—Joseph Edell
(74) Attorney, Agent, or Firm—Barnes & Thornburg

(57) ABSTRACT

The present invention relates to a child vehicle seat, and particularly, to a child vehicle seat detachably coupled to a base adapted to rest on a seat in a vehicle. More particularly, the present invention relates to a child vehicle seat that is adjustable to an upright or reclining position. The base of the child vehicle seat is formed to include a storage compartment.

43 Claims, 13 Drawing Sheets

U.S. PATENT DOCUMENTS

| | | | | |
|---|---|---|---|---|
| 4,770,468 | A | 9/1988 | Shubin | |
| 4,826,246 | A | 5/1989 | Meeker | |
| D305,583 | S | 1/1990 | Turner et al. | |
| 4,915,446 | A | 4/1990 | Darling et al. | |
| 4,943,113 | A | 7/1990 | Meeker | |
| D319,543 | S | 9/1991 | Takahashi et al. | |
| 5,052,750 | A | 10/1991 | Takahashi et al. | |
| D321,449 | S | 11/1991 | Meeker | |
| 5,106,154 | A * | 4/1992 | Kain | 297/256.14 |
| 5,110,182 | A | 5/1992 | Beauvais | |
| 5,181,761 | A | 1/1993 | Meeker | |
| D334,847 | S | 4/1993 | Takahashi et al. | |
| 5,228,746 | A | 7/1993 | Burleigh | |
| 5,236,221 | A | 8/1993 | Minami | |
| 5,277,472 | A | 1/1994 | Freese et al. | |
| 5,286,085 | A | 2/1994 | Minami | |
| 5,335,964 | A * | 8/1994 | Sedlack et al. | 297/256.13 |
| 5,380,062 | A | 1/1995 | Nania | |
| 5,385,387 | A | 1/1995 | Kain | |
| 5,462,333 | A | 10/1995 | Beauvais | |
| 5,478,135 | A | 12/1995 | Kain | |
| D366,965 | S | 2/1996 | Meeker et al. | |
| 5,509,719 | A * | 4/1996 | Cone, II | 297/344.14 |
| 5,524,965 | A | 6/1996 | Barley | |
| 5,551,751 | A | 9/1996 | Sedlack et al. | |
| 5,567,007 | A | 10/1996 | Czernakowski et al. | |
| 5,567,008 | A | 10/1996 | Cone, II | |
| D376,919 | S | 12/1996 | Sedlack | |
| 5,609,393 | A * | 3/1997 | Meeker et al. | 297/256.13 |
| 5,611,596 | A | 3/1997 | Barley et al. | |
| D383,912 | S | 9/1997 | Meeker et al. | |
| 5,664,930 | A | 9/1997 | Garcia et al. | |
| 5,671,791 | A | 9/1997 | Koyanagi et al. | |
| 5,722,719 | A | 3/1998 | Glomstad | |
| 5,746,478 | A | 5/1998 | Lumley et al. | |
| 5,890,762 | A * | 4/1999 | Yoshida | 297/256.13 |
| 6,017,088 | A * | 1/2000 | Stephens et al. | 297/256.16 |
| 6,033,019 | A * | 3/2000 | Hession-Kunz et al. | 297/250.1 |
| 6,139,101 | A * | 10/2000 | Berringer et al. | 297/256.1 |
| 6,170,911 | B1 | 1/2001 | Kassai et al. | |
| 6,196,629 | B1 * | 3/2001 | Onishi et al. | 297/256.12 |
| 6,299,249 | B1 | 10/2001 | Mori | |

* cited by examiner

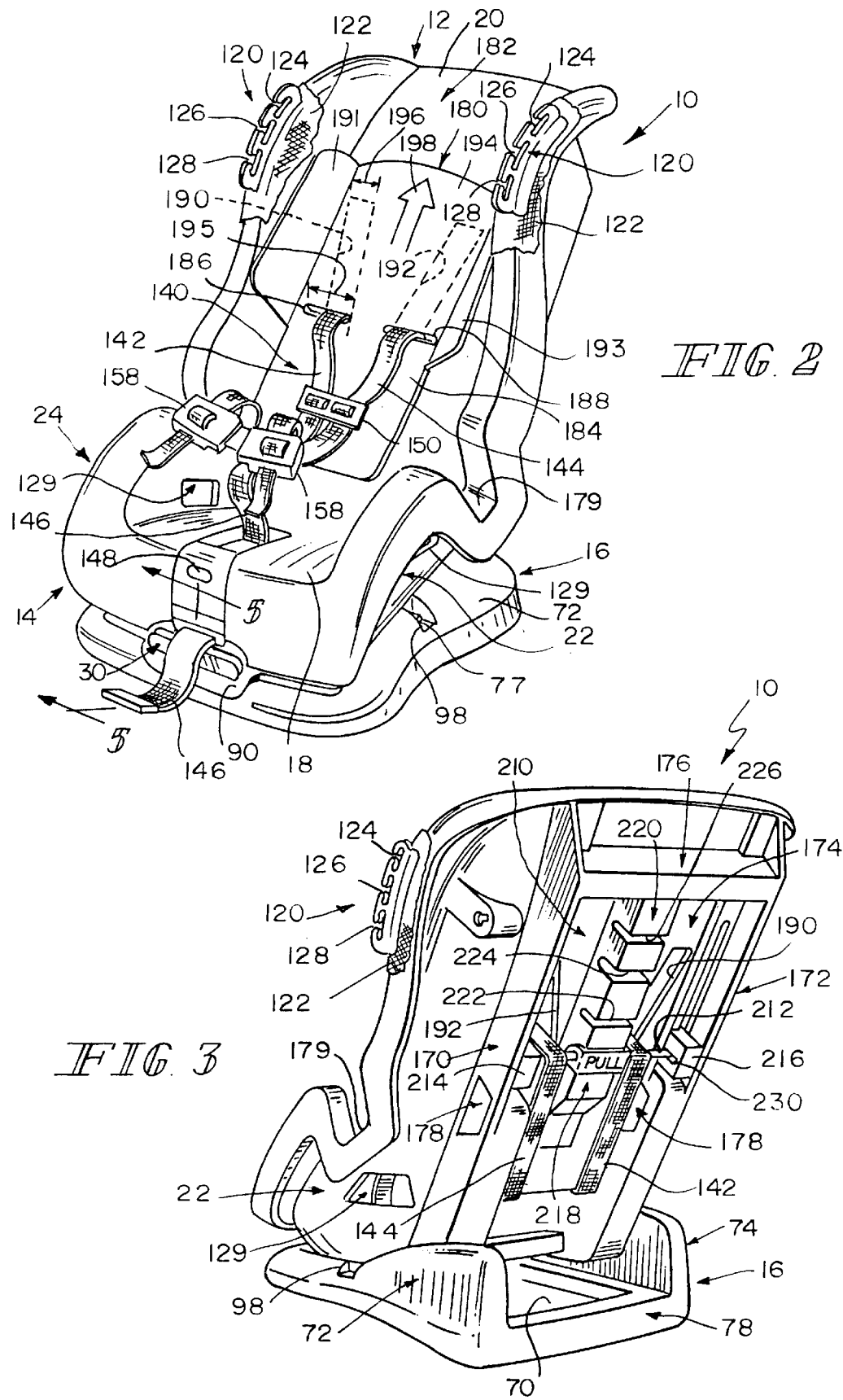

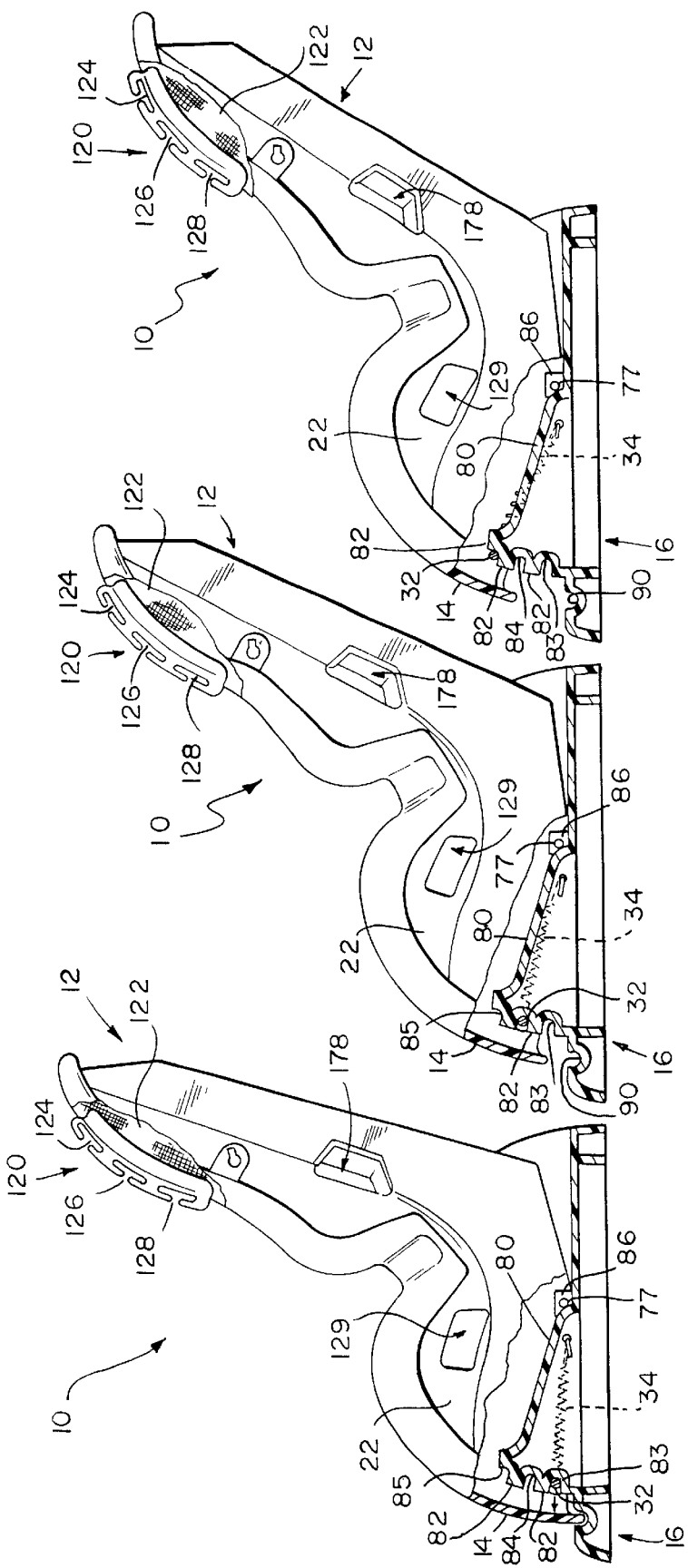

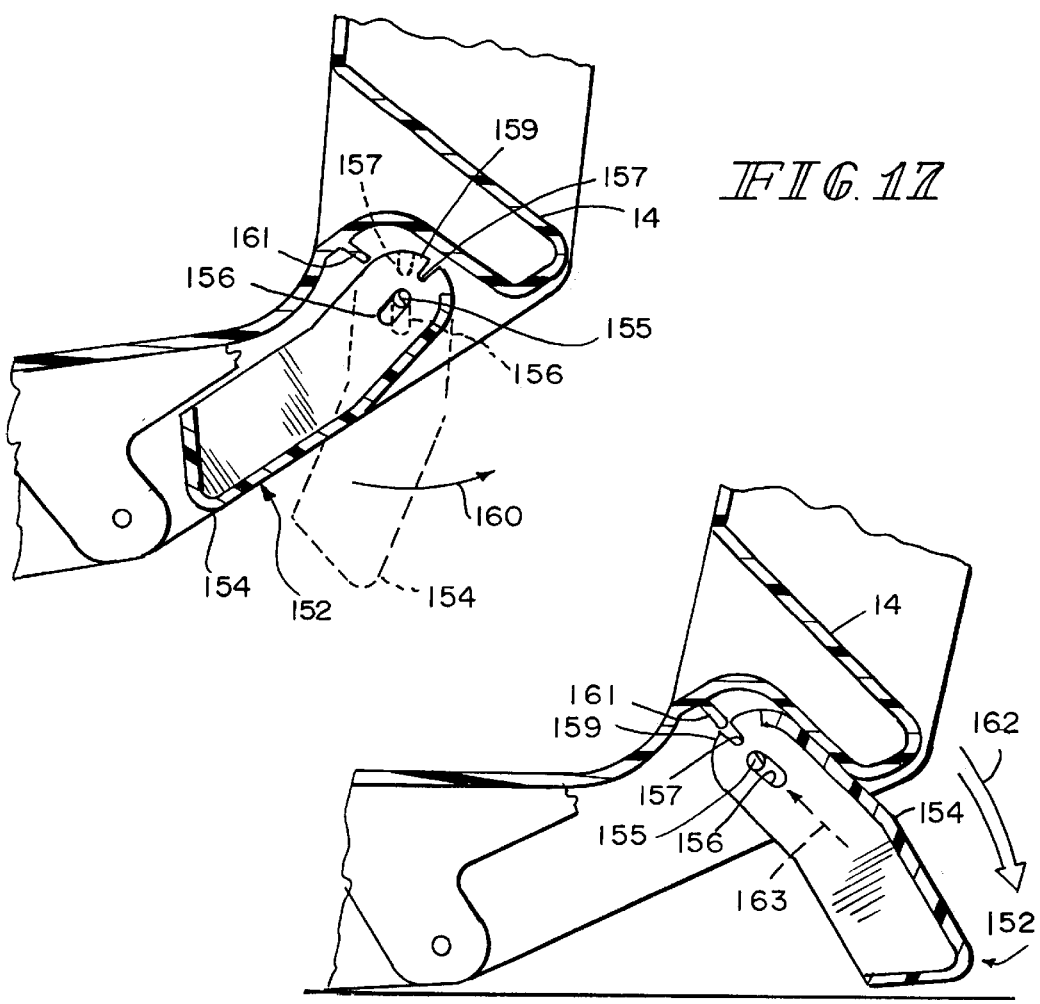
FIG. 17
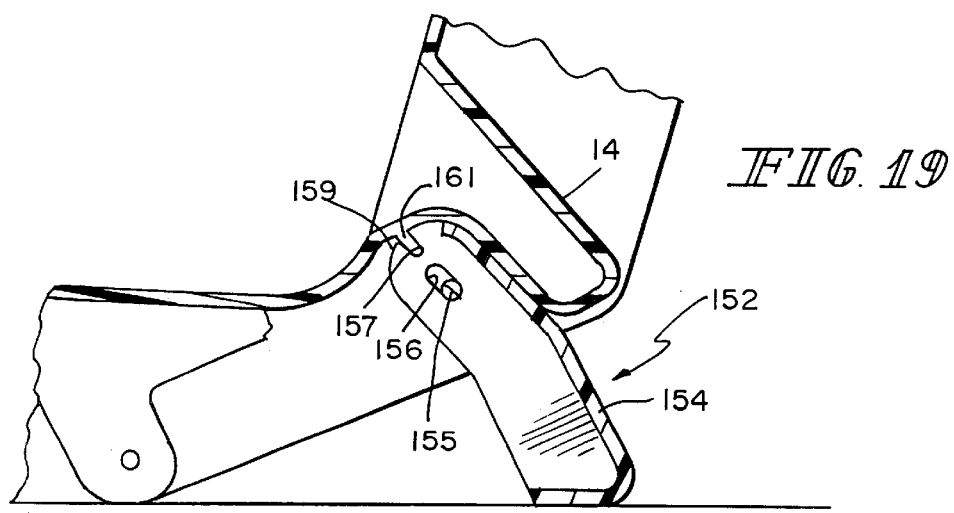
FIG. 18
FIG. 19

CHILD VEHICLE SEAT WITH ADJUSTABLE AND REMOVABLE BASE

This application claims priority under 35 U.S.C. 119(e) to U.S. Provisional Application Ser. No. 60/143,309, filed Jul. 12, 1999, which is expressly incorporated by reference herein.

BACKGROUND AND SUMMARY OF THE INVENTION

The present invention relates to a child vehicle seat, and particularly, to a child vehicle seat coupled to a base adapted to rest on a seat in a vehicle. More particularly, the present invention relates to upright and reclined child vehicle seats.

Child vehicle seats are used to secure young children safely within a vehicle. It is known for infants to be seated in a rear-facing vehicle seat in a reclined position more comfortable to a young child. As the child grows and matures, it becomes necessary to graduate the child from the rear-facing vehicle seat to a front-facing vehicle seat that is preferably in a more upright position, yet still partially reclined. This type of vehicle seat is suitable for toddlers. As the child grows larger but is still in need of a vehicle seat, it becomes necessary to fit the larger child in a third vehicle seat most often in the complete upright position often having a seat belt structure different from that of vehicle seats for smaller children.

It has been observed that for these three child development stages described above, it is often necessary to purchase three different child vehicle seats in order to accommodate the growing child. This is mainly due to the fact that the child vehicle seat must be interchangeable between rear-facing and front-facing positions while also being pivotally movable between inclined and upright positions.

According to the present invention a seat assembly suitable for supporting a child in various recline positions on a vehicle seat is provided. The seat assembly comprises a base and a seat pivotally and detachably coupled to the base. The base includes a body and a recline support coupled to the body. The recline support of the base defines a plurality of adjustable positions. The seat includes a seat shell and a release mechanism coupled to the seat shell. The seat shell is pivotable about an axis relative to the base. The release mechanism is configured to engage the recline support at one of the adjustable positions.

In preferred embodiments of the invention, the seat shell includes a bottom seat portion, a back support portion coupled to the bottom seat portion and positioned to lie at an angle to the bottom seat portion, and first and second side walls each coupled to the bottom seat portion and the back support portion and positioned to lie in spaced-apart relation to each other. The axis about which the seat pivots is defined by a mounting rod adapted to extend through the body of the base and the seat shell in order to coupled the seat to the base. The release mechanism includes a release rod coupled to and positioned to lie between the first and second side walls of the seat shell, a release handle coupled to the release rod and positioned to lie between the first and second side walls of the seat shell, and a spring coupled to the release rod and the seat shell. The spring is provided in order to bias the release rod into engagement with one of the adjustable positions of the recline support. The adjustable positions are defined by teeth which form detents and recesses for receiving the release rod therein.

The release mechanism is movable between a lock position and a release position. The release rod is engaged with one of the recesses of the recline support with the release mechanism is in the lock mechanism. When in the release position, the release rod is spaced-apart from the recline support to allow the seat to pivot about the mounting rod.

Further, the seat of the seat assembly of the present invention is removable from the base in order to be placed on a vehicle seat independent of the base for use with older or larger children, for example. The seat includes a recline arm pivotally coupled to the seat shell and movable between a fully retracted position and a fully extended position. When the seat is coupled to the base, the recline arm is in the fully retracted position. When the seat is detached from the base and positioned on a vehicle seat, the recline arm can be moved to the fully extended position to support the seat on the vehicle seat.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is a front perspective view of the seat assembly in a generally upright, front-facing position showing the seat having a seat shell, three-position shoulder belt clips coupled to fabric surrounding the seat shell for adjusting the position of a vehicle shoulder belt, an adjustable child-restraint harness coupled to the seat shell, and a harness-control panel movable up and down relative to the seat shell, and also showing a release handle mounted to a front lower edge of the seat shell at the junction between the seat shell and the underlying base;

FIG. 3 is a rear perspective view of the seat assembly of FIGS. 1 and 2 showing shoulder belts of the child-restraint harness extending along a back side of the seat shell and engaging a horizontal belt support bar included in a panel height-adjustment mechanism coupled to the harness-control panel and the seat shell through an opening formed in the seat shell and showing a slotted vertical support branch coupled to the back side of the seat shell and a bar release member (PULL) handle included in the panel height-adjustment mechanism;

FIG. 5 is a sectional view of the seat assembly, taken along line 5—5 of FIG. 2, showing engagement of the spring-loaded release rod in one of the slots in the pie-shaped recline support to lock the seat in the upright position;

FIG. 6 is a sectional view, taken along line 6—6 of FIG. 5;

FIGS. 10–12 show a sequence movement of the seat assembly from an upright position to a partially-reclined position, and finally to a fully-reclined position. The sequence of movement being made possible when the release rod is disengaged from the recess of the pie-shaped recline supports as shown in FIG. 9;

FIG. 10 is a view of the seat assembly of FIG. 1 with portions broken showing the seat positioned in the third, upright position relative to the base for use as front-facing seat for larger children and also showing the release rod biased by the springs to rest in the third recess of the recline supports of the base;

FIG. 11 is a view similar to FIG. 10 showing the seat positioned in the second, partially-reclined position relative to the base for use as a front-facing vehicle seat and also showing the release rod resting in a second recess of the recline supports so that the seat sits in a more reclined position is suitable for children slightly larger than those suitable for the seat assembly as shown in FIG. 10;

FIG. 12 is a view similar to FIG. 11 showing the seat positioned in the first, fully-reclined position for use as a rear-facing vehicle seat and also showing the release rod being received within a first recess of the recline supports so that the seat assembly is more suitable for infants or smaller children;

FIG. 17 is a partial sectional view of the recline arm of FIGS. 15 and 16 showing the recline arm in a fully retracted position within a cavity of the seat shell and also showing the recline arm, in phantom, pivoted about a pin away from the seat shell, and further showing the recline arm having a leg formed to include a first slot positioned to receive the pin and a second slot positioned to lie at an outer edge of the leg near the first slot;

FIG. 18 is a sectional view similar to FIG. 17 showing the recline arm in a fully extended and unlocked position so that the second slot is aligned with and spaced apart from a tab portion molded into the seat shell;

FIG. 19 is a sectional view similar to FIGS. 16 and 17 showing the recline arm in a fully extended and locked position with respect to the seat so that the tab portion is received within the second slot;

DETAILED DESCRIPTION OF THE DRAWINGS

Figure 1:
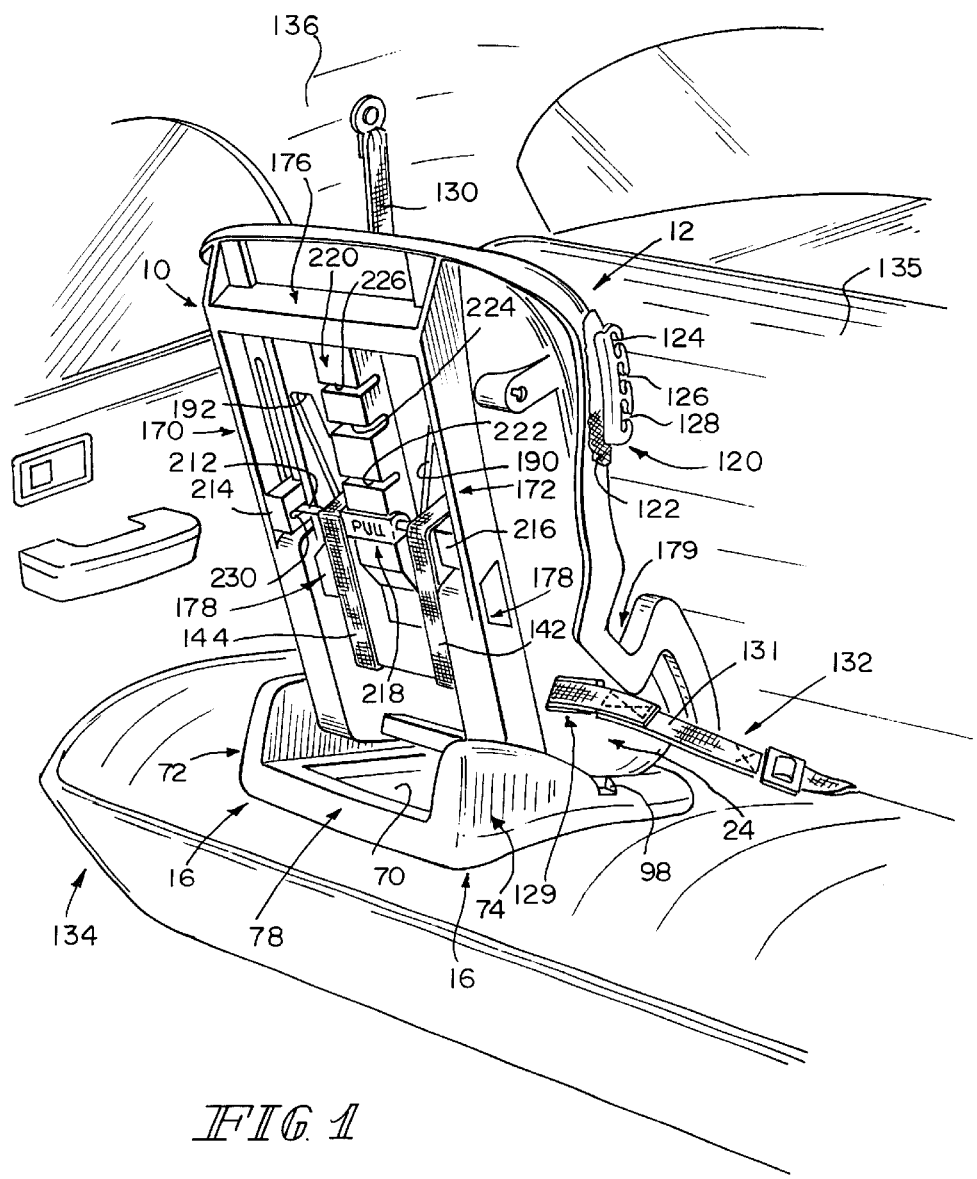
FIG. 1 is a perspective view of a seat assembly mounted in a first rear-facing, reclined position on a vehicle seat within a vehicle, the seat assembly being configured to include a base and a seat adjustable on the base and being secured to the vehicle by a vehicle seat belt extending through a pair of first windows located on a bottom portion of the seat.

A seat assembly 10 includes a seat 12 and a base 16. Seat 12 includes a seat shell 14 which, like base 16, is molded out of a plastic material. Seat 12 is pivotally coupled to base 16 between three different positions including upright, partially-reclined, and fully-reclined, as shown, for example, in FIGS. 10–12, in order to accommodate children of various size and age. Seat assembly 10 can also be converted for use as a rear-facing seat, as shown in FIG. 1, or as a front-facing seat, as shown in FIG. 2. In FIG. 1, seat assembly 10 is positioned on a vehicle seat 134 within a vehicle 136. Here, seat assembly 10 is mounted in the rear-facing, fully-reclined position and may be used for infants or smaller children, for example.

Figure 15:
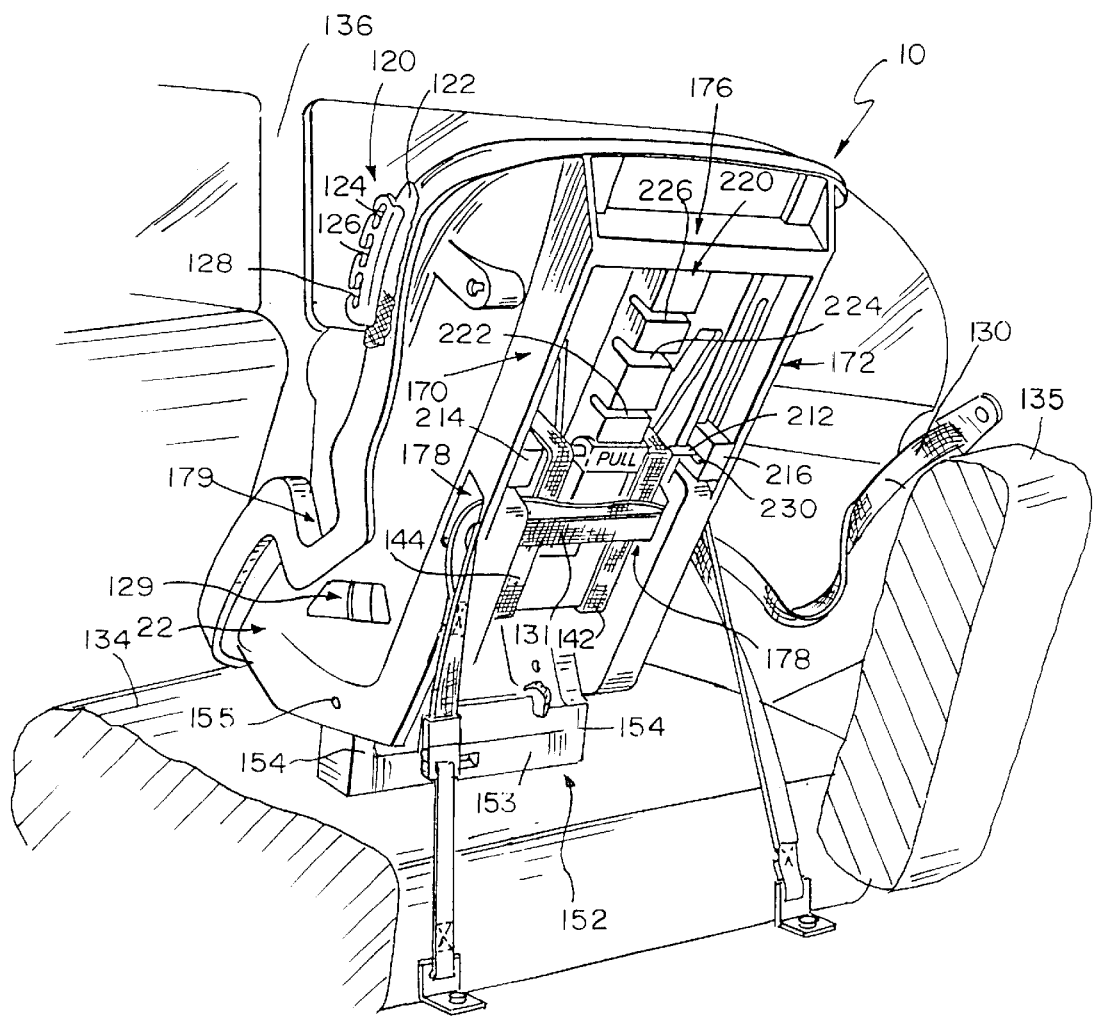
FIG. 15 is a rear perspective view of the child seat of FIG. 14 mounted in a front facing position on the vehicle seat without the use of the seat base and also showing a recline arm coupled to the child seat and moved relative to the child seat to an extended position to support the child seat on the vehicle seat in a more upright position.
Figure 16:
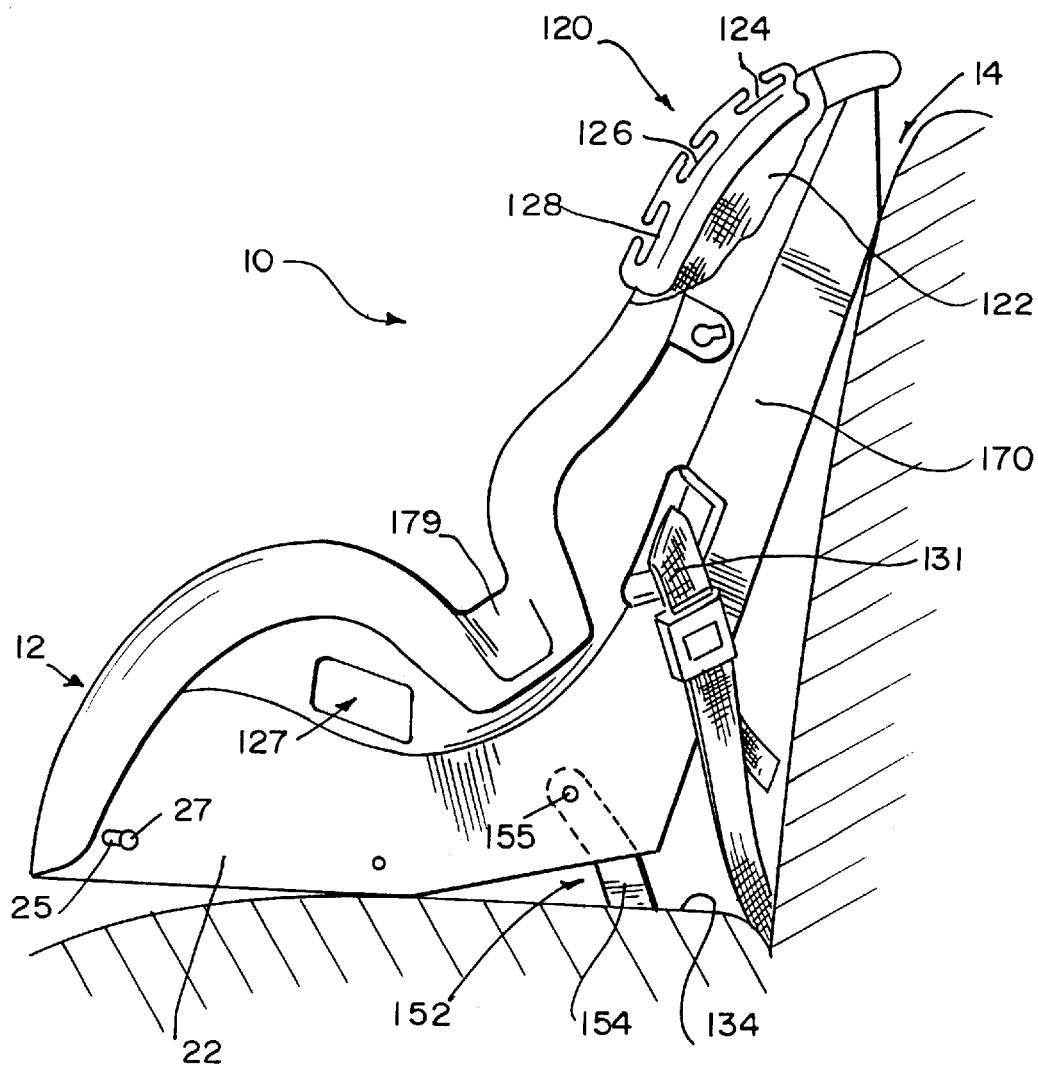
FIG. 16 is a side view of the child seat shown in FIG. 15 shown to be supported on the vehicle seat by the extended arm.

Seat 12 is detachable from base 16 for use as a free standing seat, as shown in FIGS. 15 and 16. Seat 12 further includes a recline arm 152 pivotally coupled to seat shell 14 for movement between fully retracted and fully extended positions, as shown in FIGS. 17–19. When seat 12 is coupled to base 16, recline arm 152 is positioned to lie in the fully retracted position shown in FIG. 17. In order to use seat 12 as a free-standing seat without the use of base 16, recline arm 152 can be pivoted to the fully extended position, as shown in FIGS. 15, 16, and 19 in order to support seat 12 in a more upright position.

Referring now to FIG. 2, seat shell 14 includes a bottom seat portion 18 for supporting a child's bottom and upper legs and a back support portion 20 positioned to lie at an angle to bottom seat portion 18. First and second side wall portions 22, 24 are provided for preventing lateral movement of the child in seat assembly 10 and lie on opposite sides of bottom seat portion 18, as shown in FIG. 2. A cushion or seat cover 122 can cover bottom and/or back support portions 18, 20 for added comfort.

Figure 4:
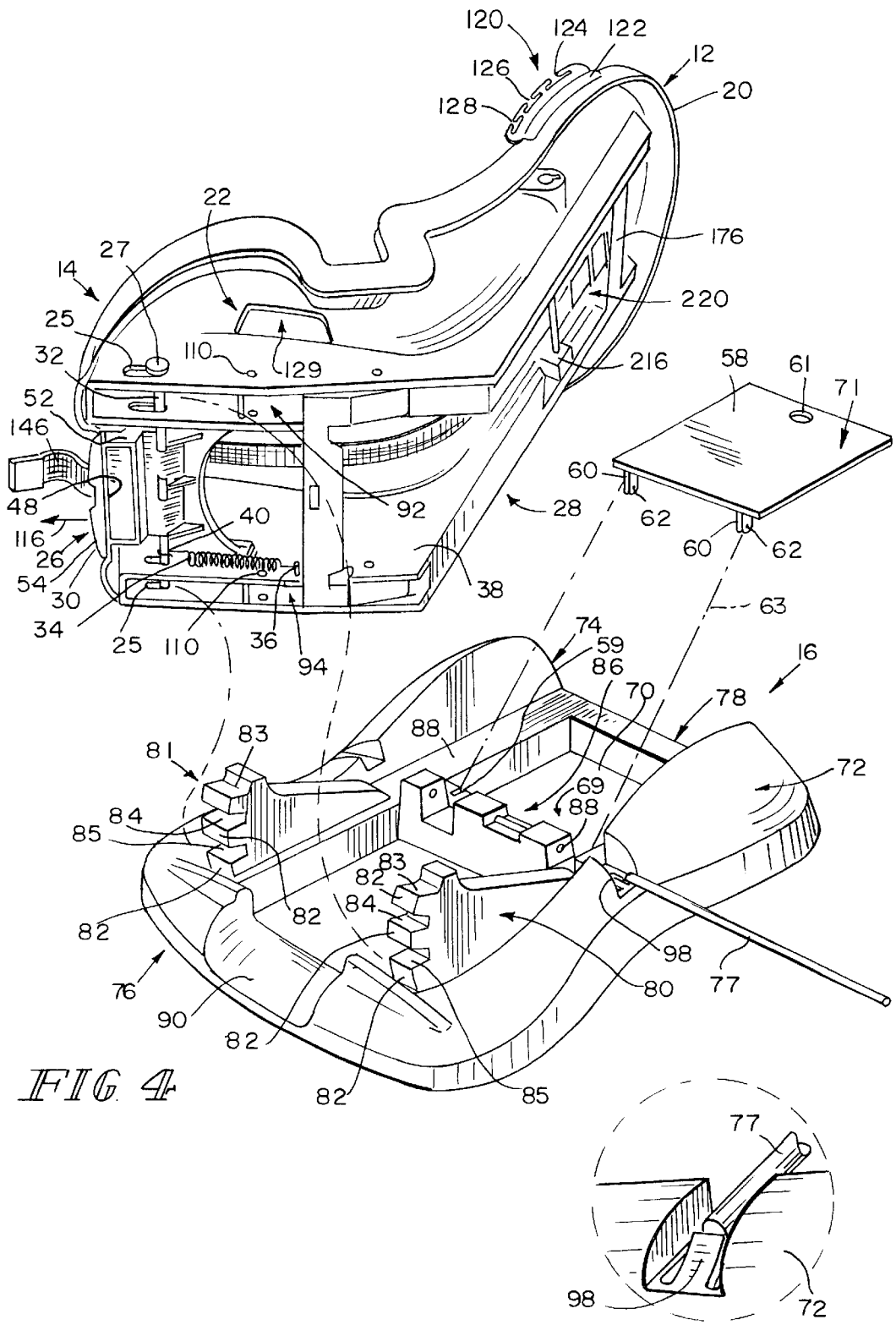
FIG. 4 is a perspective view of the seat assembly of FIGS. 1–3 (after the seat has been removed from the base) showing the release-mechanism coupled to an underside of the seat shell, a spring-loaded release rod, one of two springs attaching the release rod to the seat shell, and a release handle coupled to the release rod and also showing the base including two spaced-apart, toothed, pie-shaped recline supports for coupling with the spring-loaded release rod (to establish the upright and reclined positions of the seat relative to the base as shown in FIGS. 10–12) as indicated by the dotted lines, and also showing the base including a mounting rod for pivotally coupling the seat to the base so that the seat can be pivoted relative to the base to the upright position or any of the reclined positions.

Seat 12 includes a release mechanism 26 coupled to an underside 28 of seat shell 14, as shown in FIG. 4. Release mechanism 26 is provided to releaseably couple seat 12 to base 16. Release mechanism 26 includes a spring-loaded release rod 32, spring means defined by first and second springs 34, and a release handle 30 coupled to the release rod 32. Release rod 32 serves as an illustrative engaging element or a release element of release mechanism 26. Each spring 34 is attached at a first end 36 to an inside surface 38 of seat shell 14 and at a second end 40 to release rod 32. Rod 32 extends generally horizontally between side walls 22, 24 of seat shell 14 and is movable within slots 25 formed in side walls 22, 24. End caps 27 are coupled to rod 32 at opposite ends to prevent lateral movement of rod 32.

Figure 6:
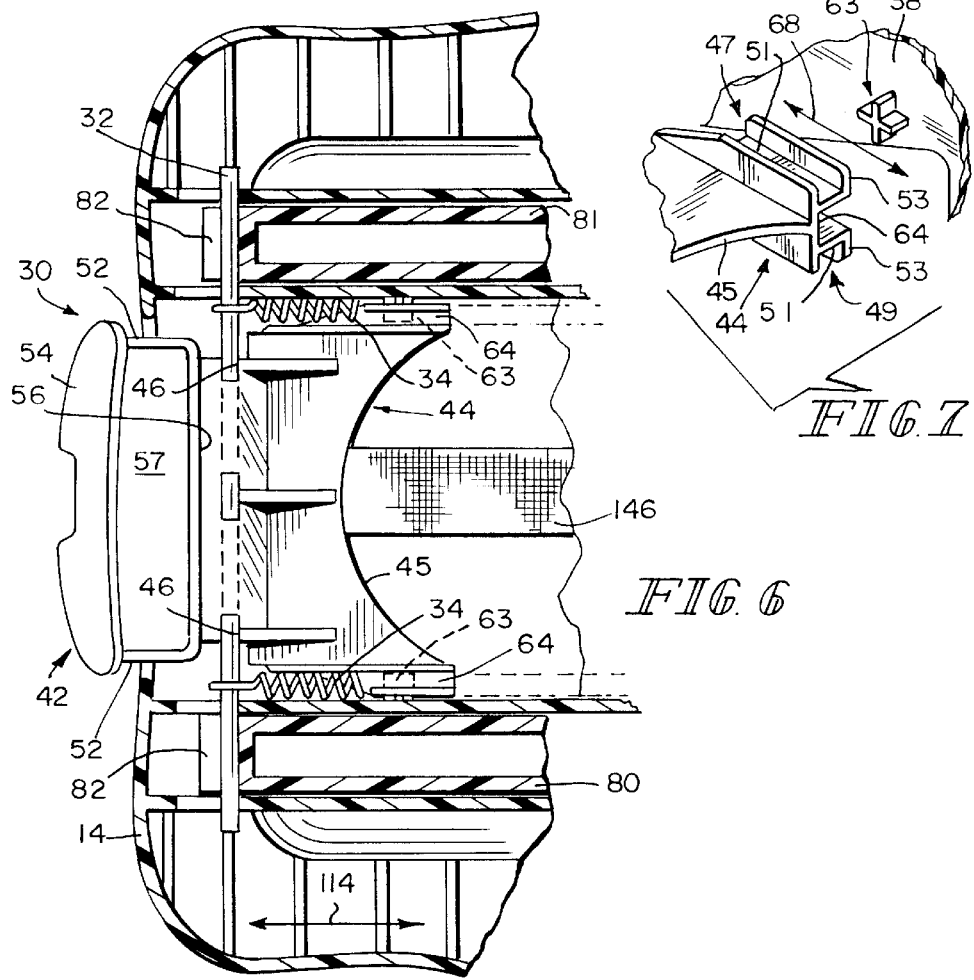
Figure 7:
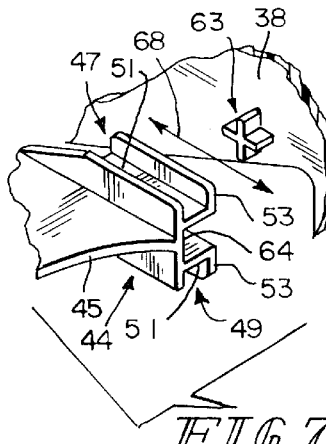
FIG. 7 is an exploded, perspective view of a portion of the release handle and an inside surface of the seat shell looking in the direction of the double arrow shown in FIG. 6, with portions broken away, showing the release handle formed to include a channel defined by upper and lower "L-shaped" members and also showing an "X-shaped" guide post coupled to a portion of one of the pie-shaped recline supports so that the guide post is formed to be received within the channel of the release handle in order to guide the release handle along a generally horizontal path of motion shown by the arrow in FIG. 7.
Figure 8:
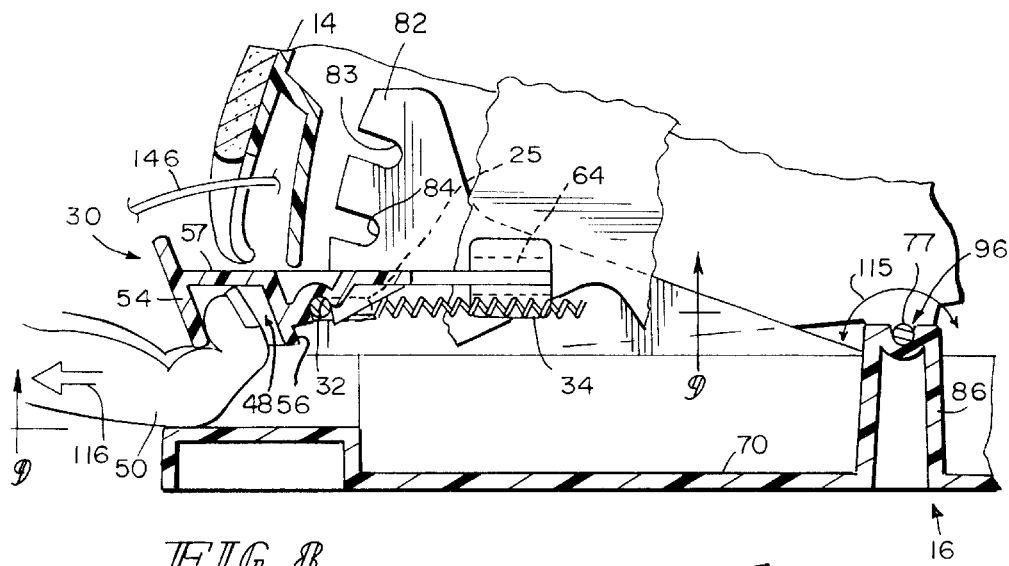
FIG. 8 is a view similar to FIG. 5 of the seat assembly wherein a user has moved the release handle to the left in order to disengage the release rod from the recess of the pie-shaped recline supports of the base leaving the seat in an unlocked position relative to the base so that the seat is thereby pivotally movable about the mounting rod.
Figure 9:
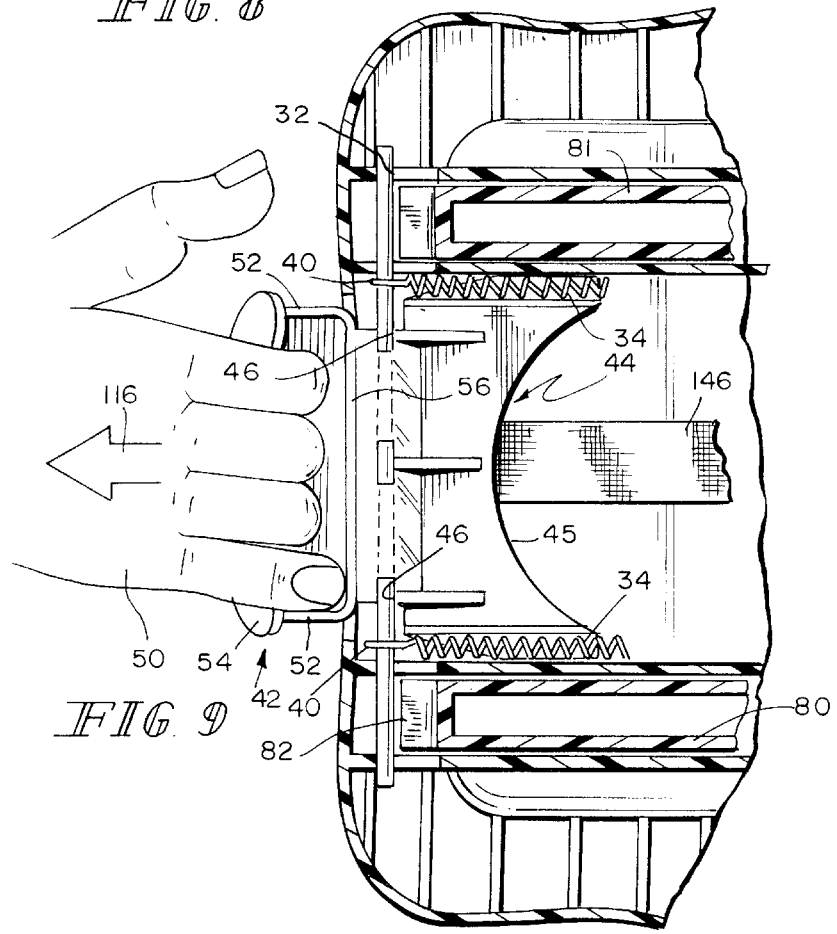
FIG. 9 is a sectional view, taken along line 9—9 of FIG. 8, showing the release rod of the release mechanism disengaged from the recess of each of the pie-shaped recline supports.

As shown in FIG. 6, release handle 30 is formed to include a grip portion 42 and a guide portion 44 forming a curved edge 45. Grip portion 42 is formed to include a cavity 48 defined by opposite side walls 52, front wall 54, back wall 56, and top wall 57. Cavity 48 is formed to receive a hand 50 to grasp release handle 30 as shown in FIGS. 8 and 9. Guide portion 44 of release handle 30 includes windows 46 formed to receive release rod 32 therethrough. Release handle 30 is further formed to include a channel 64 at each end of guide portion 44, as shown in FIG. 7. Channel 64 is formed by an upper "L-shaped" member 47 and a lower "L-shaped" member 49. Upper L-shaped member 47 and lower L-shaped member 49 are each formed to include a base 51 and a flange 53. Flange 53 of upper L-shaped member 47 is positioned to extend in a generally upward direction. Flange 53 of lower L-shaped member 49 is positioned to extend in a generally downward direction, as shown in FIG. 7.

Seat shell 14 is further formed to include an "X-shaped" guide post 63 extending from each inside surface 38 of shell 14, as shown in FIG. 7. Each guide post 63 is formed to be received within corresponding channel 64 of guide portion 44 of release handle 30. Guide posts 63 are provided to guide release handle 30 along a generally horizontal path of motion shown in FIG. 7 by arrow 68. It is within the scope of the disclosure to include guide posts 63 that are not "X-shaped" but are still receivable within channels 64.

Referring now to FIG. 4, base 16 includes a floor 70, spaced-apart side walls 72, 74 extending up from floor 70, front and back portions 76, 78, and a mounting rod 77 providing an axis about which the seat shell will pivot. It will be appreciated that various pivot mechanisms may be used to serve the pivot axis purpose of rod 77. First and second pie-shaped recline supports 80, 81 are coupled to each side wall 72, 74. Each recline support 80, 81 includes a plurality of adjustable positions defined by teeth forming detents 82 and first, second, and third recesses 83, 84, and 85, respectively. First recess 83 corresponds to a first, fully-reclined position of seat 12 relative to base 16 (see FIG. 12), second recess 84 corresponds to a second, partially-reclined position (see FIG. 11), and third recess 85 corresponds to a third, upright position of seat 12 (see FIG. 10). A partition 86 extends upwardly from floor 70 and is located approximately mid-way between front and back portions 76, 78 of base 16, as shown in FIG. 4. Partition 86 is formed to define aperture 88 which extends horizontally through partition 86 from side wall 72 to opposite side wall 74. Mounting rod 77 is received within aperture 88. Front portion 76 of base 16 is formed to include a cut-out portion 90 in order to accommodate release handle 30 of seat 12 when seat 12 is coupled to base 16.

Base 16 is also formed to include a storage compartment 69. Storage compartment 69 is formed by floor 70, back portion 78, partition 86, and side walls 72, 74. A storage lid 71 is formed to couple with partition 86 to provide a cover for storage compartment 69 as shown in FIG. 4. Storage lid 71 includes a flat cover 58 and two tabs 60 each formed to include an aperture 62. Partition 86 is formed to include slots 59. Slots 59 are formed to receive tabs 60 therein as shown by dotted lines 63 in FIG. 4. Tabs 60 may be secured within slots 59 by a pin (not shown) received within each aperture 62 of each tab 60, for example. Cover 58 includes an aperture or cut-out portion 61 so that a user may open lid 71 by pivoting lid 71 about tabs 60. It is within the scope of the disclosure to include lid 71 coupled to base 16 by means other than tabs 60.

Seat 12 sets on base 16 so that recline supports 80, 81 are received within cavities 92, 94 formed in seat shell 14. As stated before, release handle 30 is positioned to lie in cut-out portion 90 of base 16. In order to pivotally couple base 16 to seat 12, mounting rod 77 is received within apertures 88 of base 16 and apertures 110, shown in FIG. 4, of seat shell 14. Apertures 110 are formed in side walls 22, 24 of seat shell 14. Seat 12 is thus pivotable about mounting rod 77 or pivot point 96 shown in FIGS. 5 and 8 in order to move seat 12 between the fully-reclined, partially-reclined, and upright positions.

Figure 5:
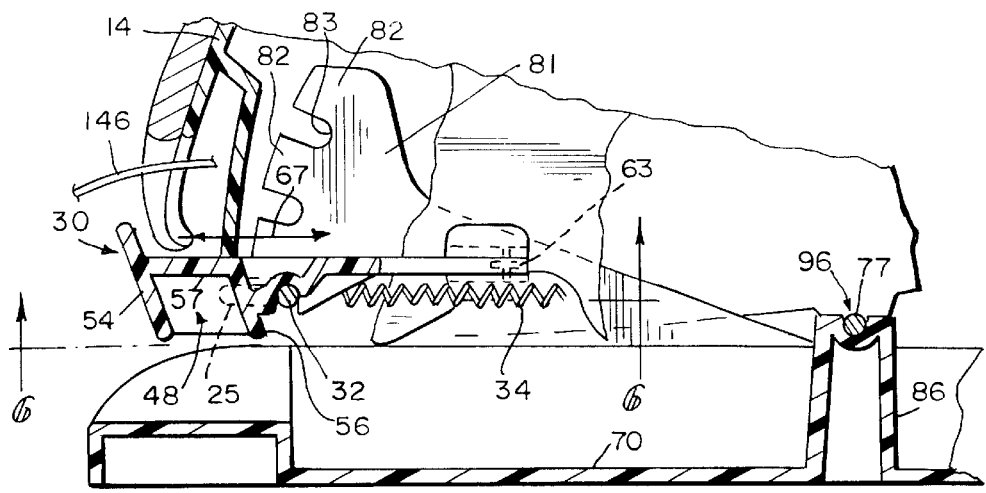
FIGS. 5 and 6 show bow the springs included in the release mechanism pull the release rod (to the right) into the lowest slot formed in the pie-shaped recline supports to lock the seat shell in a fixed position relative to the base so that the seat shell is unable to pivot about the mounting rod relative to the base.

Release rod 32 of release mechanism 26 is formed to be received within any of the three recesses 83, 84, 85 of recline supports 80, as shown in FIG. 5. When release rod 32 rests in any of the three recesses 83, 84, 85, seat 12 is in a locked position. When in the locked position, seat 12 is unable to pivot about mounting rod 77 relative to base 16. Springs 34 act to bias release rod 32 within a recess to hold seat 12 in the locked position. FIG. 5 is a sectional view of seat assembly 10 taken along line 5—5 of FIG. 2. Here, release rod 32 is shown to rest in the third recess 85 of recline support 81 leaving seat 12 in an upright, locked position relative to base 16. Directly below FIG. 5 lies another sectional view, FIG. 6, taken along line 6—6 of FIG. 5 wherein release mechanism 26 rests in the same third, locked position shown in FIG. 6. Release rod 32 is movable horizontally within slots 25 formed in side walls 22, 24 as shown by arrow 114 of FIG. 6. When release mechanism 26 is in the locked position so that mounting rod 77 is received within one of the three recesses 83, 84, 85, pivoting motion about pivot point 96 is prohibited.

To disengage release mechanism 26 from the locked position, the user's hand 50 must simply use cavity 48 to grasp grip portion 42 of release handle 30, as shown in FIGS. 8 and 9. Hand 50 must then pull release mechanism 26 in direction 116 away from back support portion 20 of seat shell 14 and against the bias of springs 34 in order to disengage release rod 32 from either of the three recesses 83, 84, 85 of recline supports 80, 81. Direction 116 represents an axis of movement of release rod 32 which is generally perpendicular to release rod 32 and mounting rod 77. Once release rod 32 has been disengaged from recline supports 80, 81, release mechanism is in an unlocked position and seat 12 is pivotally movable about mounting rod 77 as shown by arrow 115 in FIG. 8. In order for release rod 32 to again engage recline supports 80, 81 hand 50 simply must release handle 30 and springs 34 will bias release rod 32 back to the locked position within any one of the three recesses 83, 84, 85. As mentioned before, seat 12 is pivotally movable between three pre-set positions corresponding to recesses 83, 84, 85 wherein first recess 83 corresponds to the first, fully-reclined position to be used as a rear-facing child vehicle seat (see FIG. 12), recess 84 corresponds to the second, partially-reclined position (see FIG. 11), and recess 85 corresponds to the third, upright position (see FIG. 10). It is within the scope of this disclosure to include recline supports 80, 81 with any number of recesses to be used as pre-set positions for moving seat 12 between any number of reclined and upright positions.

The three positions which seat assembly 10 has the ability to be adjusted between are shown, for example, in FIGS. 10–12. Referring to FIG. 12, seat assembly 10 is shown to be in the upright position where release rod 32 is biased within third recess 85. In this upright position, seat assembly 10 may be used as a front-facing child vehicle seat for older or larger children. Seat assembly 10 is shown in the partially reclined position in FIG. 11 where release rod 32 is biased to the locked position within second recess 84. This second seat assembly configuration is appropriate to be used as a front-facing child vehicle seat for toddlers or smaller children, for example. Finally, FIG. 12 shows seat assembly 10 in the fully-reclined position where release rod 32 is biased within first recess 83. Seat assembly 10, as shown in FIG. 12, would be suitable for use as a rear-facing child vehicle seat for infants.

As shown in FIG. 1, seat assembly 10 is positioned on vehicle seat 134 within vehicle 136 in the rear-facing, fully-reclined position. Here, seat assembly 10 is mounted in a position appropriate for infants, the rear-facing position, so that back support portion 20 faces toward a seat back 135 of vehicle seat 134. Usually, release rod 32 is biased within first recess 83 when seat assembly 10 is positioned in the first mode so that seat 12 is in the fully-reclined position relative to base 16. Vehicle 136 includes a vehicle seat belt 132 for securing seat assembly 10 to the vehicle seat 134. Vehicle seat belt 132 comprises shoulder portion 130 and a lap portion 131. As shown in FIG. 1, when seat assembly 10 is in the rear-facing position, both shoulder portion 130 and lap portion 131 are received within windows 129 formed in each side 22, 24 of seat shell 14. A child sitting on seat 12 in the position shown in FIG. 1 would be held securely in place by an adjustable harness 140, shown in FIG. 2, which will be discussed herein in more detail.

Figure 13:
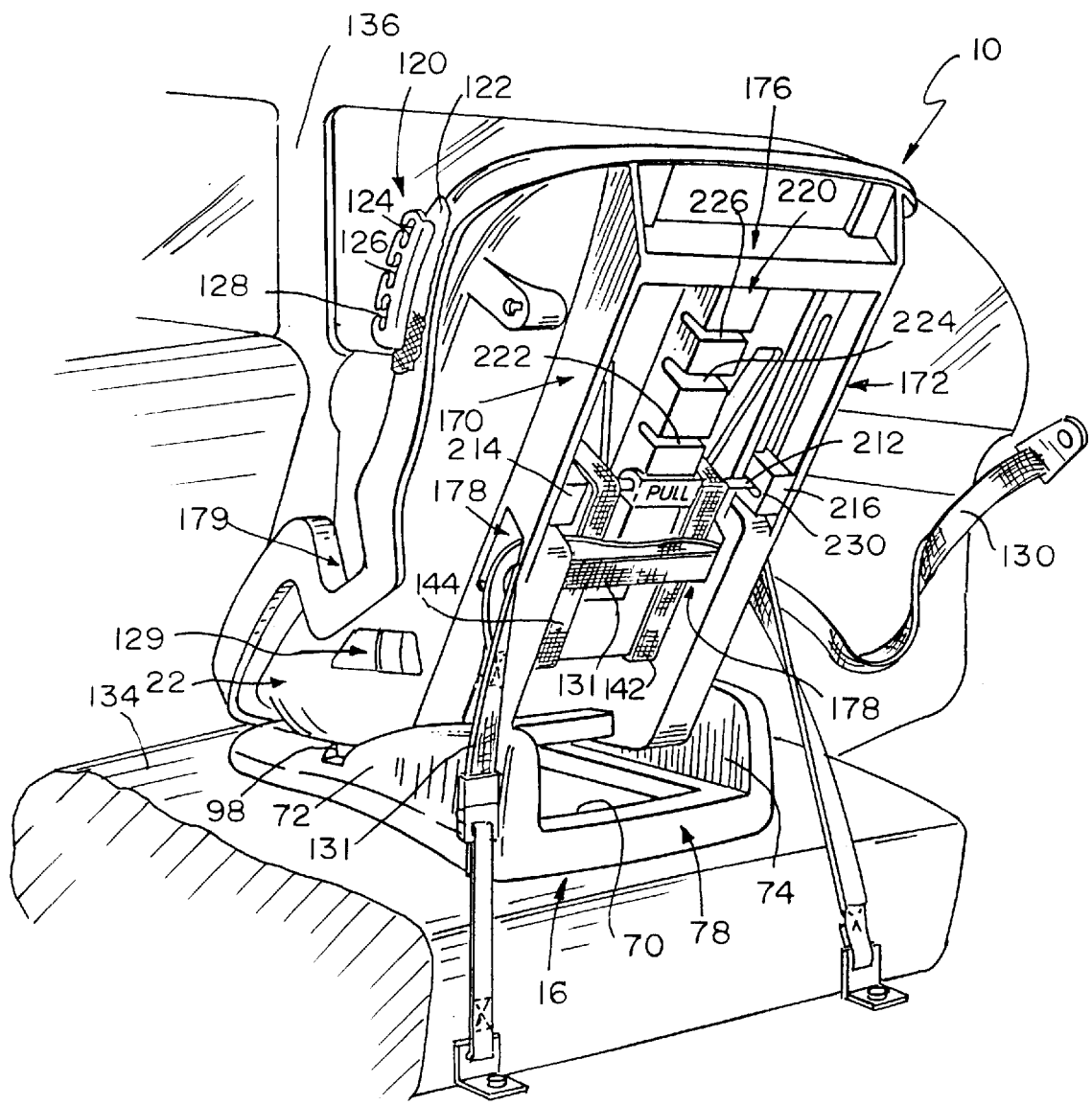
FIG. 13 is a rear perspective view of the seat assembly of FIG. 1 now mounted in the front-facing position on the vehicle seat showing the vehicle seat belt being received within a second set of windows formed in the back of the seat shell, wherein a back portion of the vehicle seat has been removed in order to show the back side of the seat shell.

FIG. 13 shows seat assembly 10 mounted in the front-facing, partially-upright position on vehicle seat 134. Seat back 135 on vehicle seat 134 is removed in order to illustrate how vehicle seat belt 132 secures seat assembly 10 within vehicle 136. A pair of first and second vertical back ribs 170, 172 of seat shell 14 define vehicle belt channels 178 for receiving vehicle seat belt 132. Release rod 32 of release mechanism 26 is generally biased within second recess 84 of each recline support 80, 81 similar to the child in the rear-facing position, the child (not shown) which would be seated in seat assembly 10 of FIG. 13 would also be held securely in place by adjustable harness 140.

Figure 14:
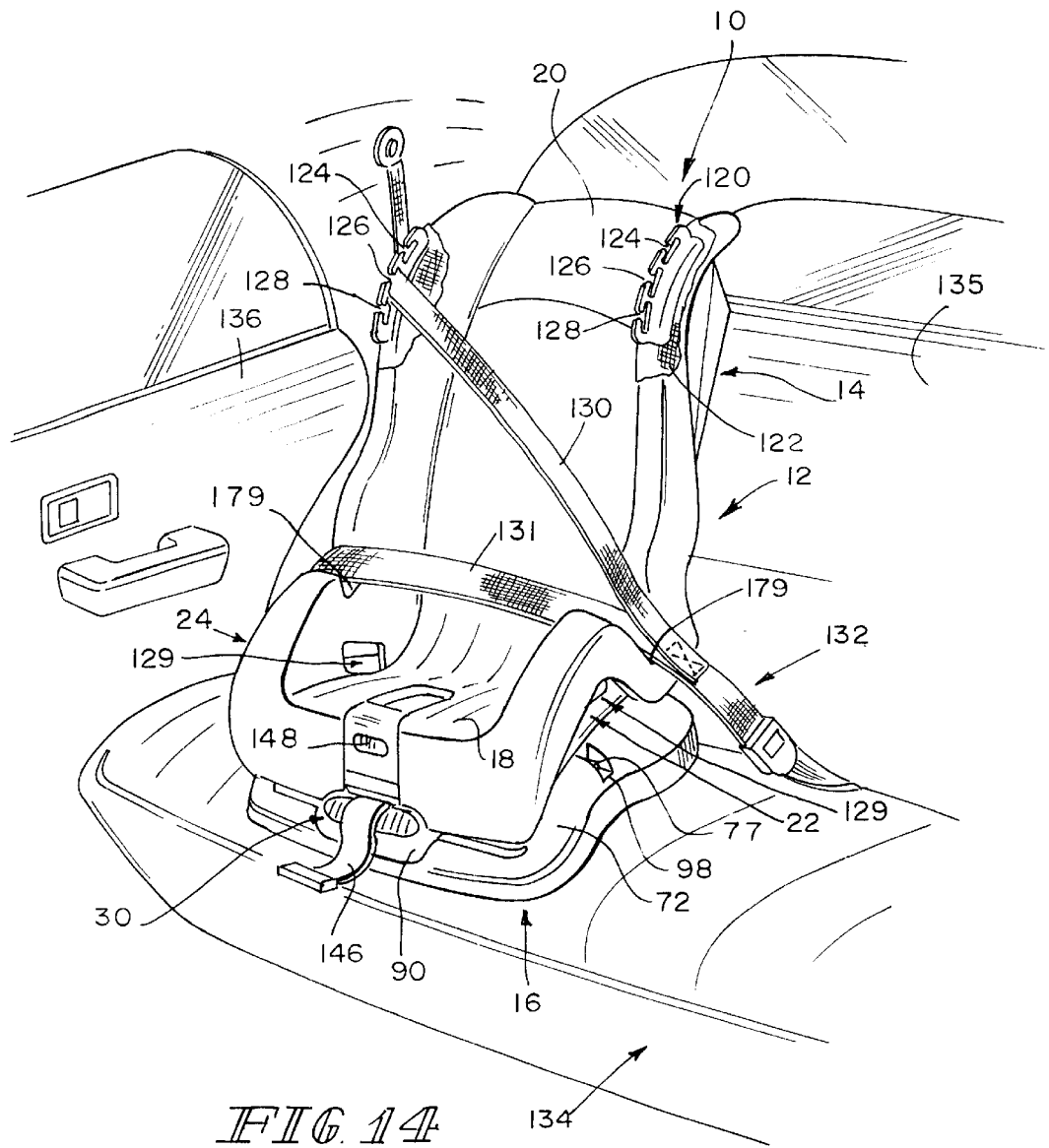
FIG. 14 is a front perspective view of the seat assembly shown without the child-restraint harness and harness-control panel in order to accommodate larger children and further showing the seat assembly mounted in the front-facing position on the vehicle seat so that a shoulder belt portion of the vehicle seat belt extends through one of the belt clips attached to the outer fabric of the child seat and a lap portion of the seat belt extends across the front of the child seat and is guided by notches formed in the seat shell.

FIG. 14 shows seat assembly 10 in the front-facing, upright position within vehicle 136. Because seat assembly 10 shown in FIG. 14 is intended for older or larger children still in need of a child vehicle seat, harness 140 has been removed and a larger child sitting in seat 12 would be held securely by shoulder and lap portions 130, 131 of vehicle seat belt 132. Seat assembly 10 further includes belt clips 120 attached to a seat cover 122 which surrounds seat shell 14. Each belt clip 120 is formed to include slots 124, 126, 128 for receiving a shoulder belt portion 130 of a vehicle seat belt 132 as shown in FIG. 14. Belt clips 120 help to control the positioning of shoulder belt portion 130 across the child (not shown) seated in seat 12. Belt clips 120 are primarily used when seat assembly 10 is in the fully upright and front-facing position. It is also within the scope of this disclosure to include belt clips 120 with varying numbers of slots (e.g. 124, 126, 128) for which to receive shoulder belt portion 130. Shoulder portion 130 is shown to be received within slot 126 of belt clip 120. However, shoulder portion 130 may be received within any of the slots 124, 126, 128 of either belt clip 120 depending upon the size and positioning of the child within seat 12 and also depending upon the positioning of seat assembly 10 within vehicle 136. Lap portion 131 of vehicle seat belt 132 extends across the front of seat 12 and is guided by notches 179 formed in seat shell 14.

Seat 12 is also detachable from base 16 to be used as a free-standing seat within vehicle 136, as shown in FIG. 15. To detach seat 12 from base 16, the user must depress a tab 99 located in notch 98 of base 16, as shown in FIG. 4. Once the tab 99 is depressed, the user may then slide mounting rod 77 through aperture 88 of base 16 and windows 110 of seat shell 14 until mounting rod 77 is completely removed from base 16. Once mounting rod 77 is removed from aperture 88 and windows 110, seat shell 14 is no longer coupled to base 16 and may be lifted by the user off of base 16 to be placed on vehicle seat 134 and used as a free-standing seat.

To be used as a free-standing seat, seat 12 is additionally formed to include a recline arm 152 coupled to seat shell 14, as shown in FIGS. 15 and 16. Recline arm 152 is formed to include a horizontal bar 153, and a leg 154 extending generally perpendicular from each end of bar 153. Each leg 154 is pivotally coupled to shell 14 by a pin 155, as shown in FIGS. 16–19. Each leg 154 is formed to include a first slot 152 for receiving pin 155 therein and a second slot 157 positioned to lie near first slot 152 at an outer edge 159 of each leg 154.

As shown in FIGS. 17–19, recline arm 152 is movable between a fully retracted position (see FIG. 17) and a fully extended and locked position (see FIG. 19). In the fully retracted position, recline arm 152 is positioned to lie between first and second side wall portions 22, 24 of seat shell 14 in order to remain hidden and unobstructing while seat 12 is coupled to base 16. To move recline arm 152 toward the fully extended position, bar 153 is rotated away from seat shell 14 in direction 160, as shown in FIG. 17. When recline arm 152 reaches a fully extended, unlocked position shown in FIG. 18, second slot 157 is aligned with a tab portion 161. Tab portion 161 is molded as part of seat shell 14. When second slot 157 is aligned with tab portion 161 seat shell 14 may then be forced generally downward in direction 162 or recline arm 152 may be forced generally upward in direction 163 until tab portion 161 is received within second slot 157 in order to position recline arm 152 in the fully-extended and locked position. When tab portion 161 is received within second slot 157, recline arm 152 is prevented from pivoting about pin 155.

When used without base 16 and supported by recline arm 152, seat 12 is adapted to be used for airline seats or where there may be narrow vehicle seats, for example. When seat 12 is used without base 16, seat 12 is to be installed in a manner similar to that described when seat assembly 10 is in the fully upright and front-facing position. Vehicle seat belt 132 may be used to secure seat 12 within vehicle belt 136 by extending through vehicle belt channels 178 as shown in FIGS. 13 and 15. Similarly, when seat 12 is used without base 16, vehicle seat belt 132 may be threaded through belt clips 120 and notches 179, as shown in FIG. 14.

Seat assembly 10 also includes many other features operating independently from release mechanism 26. Harness 140, as mentioned before, restrains the child within seat 12 when seat assembly 10 is positioned in the fully and partially-reclined positions. Harness 140 is vertically adjustable for accommodating children of various ages and sizes. As shown in FIG. 2, harness 140 includes shoulder belts 142, 144, a lower belt 146, and a harness buckle 150. Harness buckle 150 is used to hold shoulder belts 142, 144 together. Harness 140 includes another buckle 158 coupled to each shoulder belt 142, 144 and lower belt 146. Harness 140 is shown in a secured position in FIG. 2. To release harness 140 for purposes of removing a child from seat assembly 10, seat 12 includes a release button 148, as shown in FIG. 2. The user must simply depress release button 148 and harness 140 will be released from seat 12.

A means for adjusting harness 140 is shown in FIG. 13. Seat 12 includes first and second vertical back ribs 170, 172 appended to a rear side of back support portion 20 of seat shell 14. First and second vertical back ribs 170, 172 are positioned to lie in spaced-apart relation to one another to define a space 174 therebetween. As mentioned before, each vertical back rib 170, 172 is formed to include vehicle belt channels 178 for receiving vehicle seat belt 132 when seat assembly 10 is restrained on vehicle seat 134 in the front-facing positions as shown, for example, in FIG. 13. Seat 12 also includes a horizontal back rib 176 appended to back support portion 20 and positioned to interconnect upper ends of vertical back ribs 170, 172 and define an upper boundary of space 174.

Harness-control panel 180 includes a back plate 184 formed to include shoulder belt-receiving slots 186, 188, a headrest 194 provided in an upper portion of back plate 184 above slots 186, 188, and first and second wing members 191, 193 coupled to opposite edges of back plate 194 and positioned to lie in spaced-apart relation to one another. Each wing member 191, 193 is oriented to lie at an angle relative to back plate 184 as shown, for example, in FIG. 2.

Up-and-down movement of harness-control panel 180 also functions to raise and lower the height of headrest 194 above bottom seat portion 18 to adapt seat 12 to accommodate young, small-sized children or older, larger-sized children. As shown, for example, in FIG. 2 shoulder belts 142, 144 and headrest 194 move up and down together relative to seat shell 14 and seat belts 142, 144 move together and apart during movement of harness-control panel 180 to assure proper fit of a child seated in seat 12.

Back support portion 20 of seat shell 14 and back plate 184 of movable harness-control panel 180 are configured to cooperate to set a nominal height of first and second shoulder belts 142, 144 above bottom seat portion 18 of seat shell 14 so as to adapt seat 12 to accommodate either a young, smaller-sized child when seat assembly 10 is in the rear-facing, fully-reclined position as shown in FIG. 1 or an older, larger-sized child when seat assembly 10 is in the front facing, partially-reclined position as shown in FIG. 13. Back support portion 20 is formed to include two vertical slanted channels 190, 192 shown, for example, in phantom in FIG. 2. Slanted channels 190, 192 are aligned in spaced-apart diverging relation (lowest end to highest end) to lie "behind" harness-control panel 180 so that first shoulder belt 142 can pass through first slanted channel 190 and second shoulder belt 144 can pass through second slanted channel 192.

As mentioned before, harness-control panel 180 is formed to include a pair of spaced-apart horizontally extending, elongated, belt-receiving slots 186, 188 as shown, in FIG. 2. Each slot 186, 188 has a length 195 that is greater than a nominal width 196 of a companion one of the slanted channels 190, 192, as shown in FIG. 2. First slot 186 is sized to receive first shoulder belt 142 and allow first shoulder belt 142 also to pass through first slanted channel 190. Second slot 188 is sized to receive second shoulder belt 144 and allow second shoulder belt 144 also to pass through second slanted channel 192.

In order to accommodate young, small-sized children, harness-control panel 180 is moved to its lowest position shown, for example, in FIG. 2 to cause the seat shell entry points of shoulder belts 142, 144 to be lowered. In this position, it is contemplated that harness 140 will be used to restrain a young, small-sized child seated in the rear-facing, fully-reclined position within vehicle 136. By raising harness-control panel 180 upwardly in direction 198, as shown in FIG. 2 relative to back support portion 20 of seat shell 14 to cause the seat shell entry point of shoulder belts 142, 144 to be raised, somewhat older, larger children can be accommodated in the front-facing positions.

Slanted channels 190, 192 formed in back support portion 20 are sized, angled, and otherwise arranged so that they cooperate with belt-receiving slots 186, 188 formed in movable harness-control panel 180 to move shoulder belts 142, 144 close to one another when harness-control panel 180 occupies a "low position" suitable for young, small-sized children and to move the shoulder belts 142, 144 farther apart from one another when harness-control panel 180 occupies a "high position" suitable for older, larger children. Harness control panel 180 may also occupy a "middle position" suitable for medium sized toddlers. The slant angles (with respect to the vertical) of slanted channels 190, 192 and the lateral length of belt-receiving slots 186, 188 cooperate to define a pair of shoulder belt-receiving windows that effectively move closer together or farther apart in response to lowering and raising of harness-control panel 180 relative to back support portion 20.

Seat 12 can also be adjusted to accommodate even older, larger-sized children by moving harness-control panel 180 to its highest position (not shown). In such a position, harness 140 will be removed from seat 12 (or tucked in an out-of-the-way, unused position) so that an adult three-point vehicle seat belt 132, shown in FIG. 14, will be used to restrain a child seated in seat 12. In its highest position, harness-control panel 180 is used primarily to support headrest 194 in a proper elevated position relative to bottom seat portion 18. Harness-control panel 180 is not used to control the seat shell entry points of shoulder belts 142, 144 since those belts are not used to restrain a child in seat 12 in such a configuration. Belt-receiving slot 186 does not communicate with first slanted channel 190 and belt-receiving slot 188 does not communicate with second slanted channel 192 when harness-control panel 180 and its headrest 194 are positioned in the highest position. As illustrated in FIG. 14, harness-control panel 180 and harness 140 have both been removed in order to accommodate larger children. Vehicle seat belt 132 is used to secure the child within seat 12.

Referring again to FIG. 2, a harness-control panel 180 is positioned to lie in a child-receiving space 182 defined in a front portion of seat 12. Harness-control panel 180 is mounted for up-and-down movement relative to bottom seat portion 18 in seat 12. Up-and-down movement of harness-control panel 180 functions to raise and lower the "height" of shoulder belts 142, 144 above bottom seat portion 18 to adapt seat 12 to accommodate young, small-sized children or older, larger-sized children. Harness control panel 180 and harness 140 can be removed in the fully-upright position, as shown in FIG. 14 for larger children who have outgrown harness-control panel 180 and harness 140.

A panel height-adjustment mechanism 210 is included in seat 12 and operable to control the height of harness-control panel 180 relative to bottom seat portion 18. Panel height-adjustment mechanism 210 includes a belt support bar 212, a first bar-mounting block 214 coupled to rear end of first harness-control plate support arm (not shown) for movement therewith, a second bar-mounting block 216 coupled to rear end of second harness-control plate support arm (not shown) for movement therewith, and a bar release member 218 coupled to belt support bar 212.

As shown in FIG. 3, a vertical bar anchor member 220 is coupled to a rear side of back support portion 20 to lie in space 174 midway between first and second vertical back ribs 170, 172. In a presently preferred embodiment, an upper end of vertical bar anchor member 220 is coupled to a mid-portion of horizontal back rib 176. Vertical bar anchor member 220 is formed to include a plurality of vertically spaced-apart slots (e.g. slots 222, 224, and 226) where each slot is provided for receiving belt support bar 212 therein to establish a fixed position of first and second support arms (and harness-control panel 180 coupled to those support arms) relative to the underlying bottom seat portion 18 of seat shell 14. As shown in FIG. 3, belt support bar 212 with bar release member 218 are received within a "lowest" slot (not shown) defining a "lowest" position of harness-control panel 180. Slot 222 is located to define a "middle" position of harness-control panel 180, and slot 224 is located to define a "high" position of harness-control panel 180. Slot 226 is located to define a "highest" position of harness-control panel 180 wherein an older, larger sized child is restrained in seat 12 and vehicle seat belt 132 is received within either of the three slots 124, 126, 128 of either belt clip 120 rather than using child-restraint harness 140 provided in seat 12.

Each of the first and second bar-mounting blocks 214, 216 is formed to include a somewhat horizontal guide channel 230 for receiving one end (or a portion) of belt support bar 212 therein and supporting belt support bar 212 for back-and-forth sliding movement as belt support bar 212 is moved into and out of any of the slots 222, 224, and 226 formed in vertical bar anchor member 220 for movement of harness-control panel 180 relative to seat shell 14. A spring (not shown) is positioned in each of the first and second bar-mounting blocks 214, 216 and arranged to urge belt support bar 212 in a direction toward back support portion 20 so as to cause belt support bar 212 to be retained in one of the slots 222, 224, 226 formed in vertical bar anchor member 220 upon movement of belt support bar 212 into such a slot. As shown in the drawings, shoulder belts 142, 144 are positioned to wrap around belt support bar 212 and lie on opposite sides of vertical bar anchor member 220 and bar release member 218 so that any raising or lowering of belt support bar 212 relative to vertical bar anchor member 220 (and its slots 222, 224, and 226) will change the height of first and second shoulder belts 142, 144.

Figure 20:
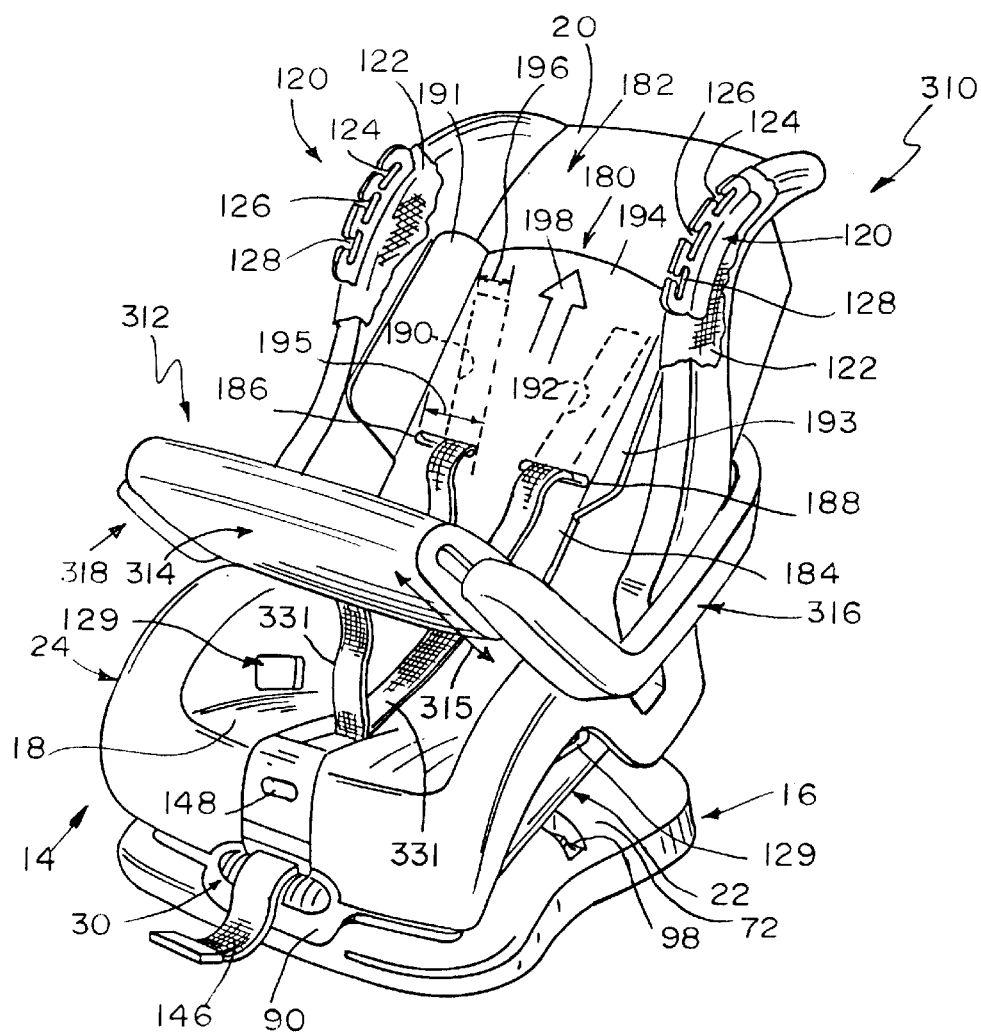
FIG. 20 is a front perspective view of another embodiment of a seat assembly of the present invention showing a barrier shield of the alternate seat assembly connected to a pivotable swing arm for restraining forward movement of a child seated in the seat assembly.

An alternate embodiment of the present invention, a seat assembly 310, is shown in FIG. 20. Seat assembly 310 is similar in most respects to seat assembly 10. However, seat assembly 310 includes a pivotable swing arm unit 312 for restraining forward movement of a child in seat 310. Swing arm unit 312 includes a barrier shield 314, a left swing arm 316 coupled to one end of barrier shield 314, and a right swing arm 318 coupled to another end of barrier shield 314. Left swing arm 316 is pivotally coupled to first side wall portion 22 of seat shell 14 and right swing arm 318 is pivotally coupled to seconds side wall portion 24 of seat shell 14. Shoulder belts 142, 144 are coupled at one end a buckle unit which connects to a strap 331 that is coupled to a buckle (not shown) which can be selectively coupled to connector (not shown) on bottom seat portion 18. Strap 331 is also coupled to barrier shield 314.

Barrier shield 314 is formed to include a button (not shown) for releasing barrier shield 314 from left and right swing arms 316, 318 in order to slidably move barrier shield 314 relative to swing arms 316, 318 along path 315, as shown in FIG. 20. Barrier shield 314 is slidably movable between four positions along path 315. When the button is not depressed, barrier shield 314 is locked in one of the four positions. Barrier shield 314 is adjustable in order to accommodate smaller and larger children in addition to providing extra space for more bulky clothes that the child may be wearing during the winter time, for example. Although barrier shield 314 is provided to adjust between four different positions along path 315, it is within the scope of this disclosure to provide a barrier shield adjustable between any number of positions. Swing arm unit 312 is provided so that it may be detached from seat 12.

Figure 21:
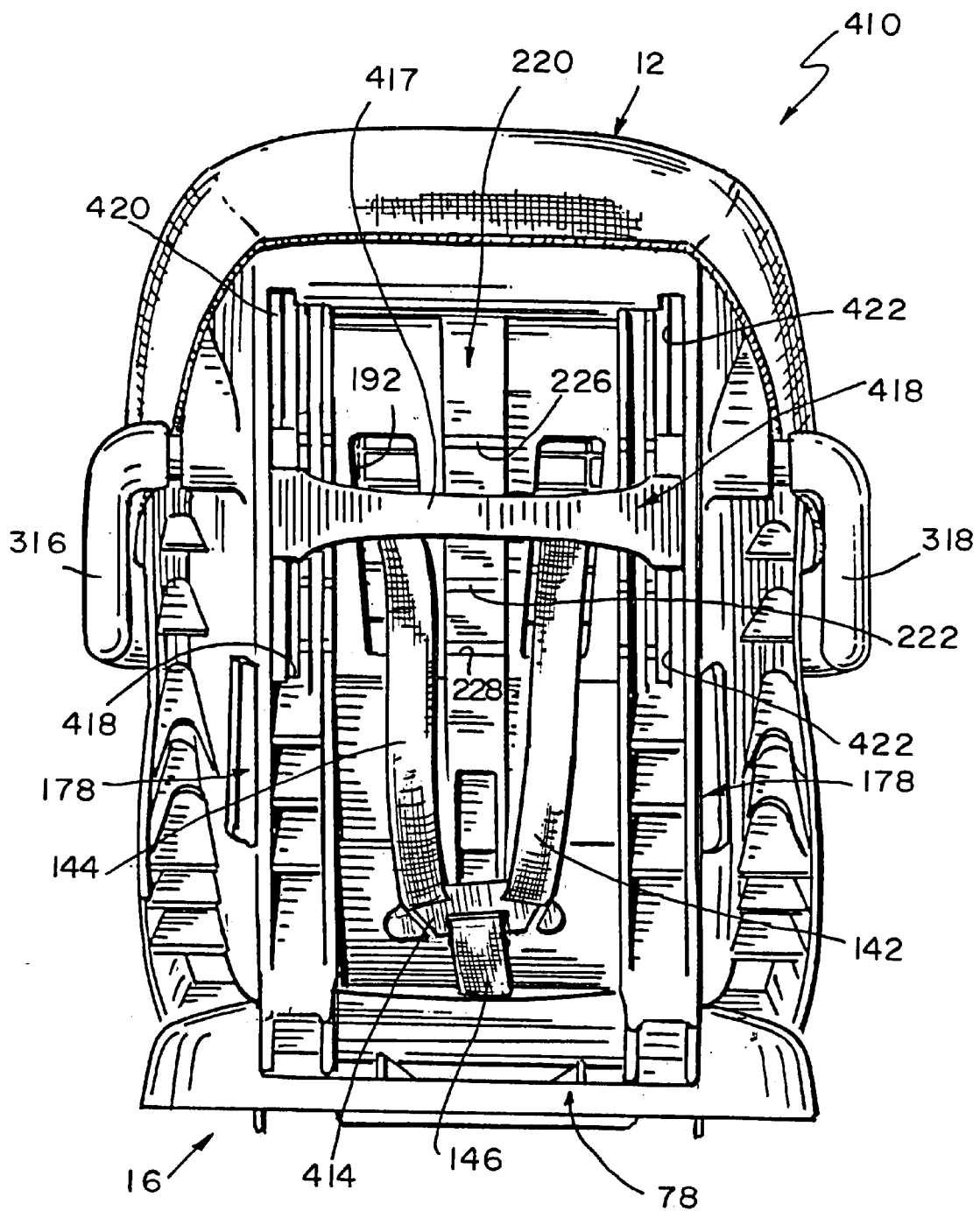
FIG. 21 is a rear view of yet another embodiment of a seat assembly in accordance with the present invention showing a child vehicle seat including a handle bar coupled to the seat shell and the belt support bar (not shown) coupled to the handle and formed to engage both shoulder belts and also showing a rear belt clip secured to both shoulder belts, and a lower belt of the seat assembly.

An additional alternate embodiment of the present invention, a seat assembly 410, is shown in FIG. 21. Seat assembly 410 is similar in most respects to seat assembly 10 and seat assembly 310. Rear side of back support portion 20 of seat assembly 410 includes vertical back ribs 170, 172 forming spaced 174, therebetween, vertical bar anchor member 220 having slots 222, 224 (not shown), 226 and a lowest slot 228, and slanted channels 190, 192 through which shoulder straps 142, 144 extend. However, seat assembly 410 includes a handle bar 418 coupled to the belt support bar 212 (not shown). Handle bar 418 is positioned to extend between vertical back ribs 170, 172. Handle bar 418 includes a grip member 417 coupled to and positioned to extend between first and second arms (not shown). The first arm of handle bar 418 passes through a first vertical guide slot 420 formed in back support portion of seat shell 14 and the second arm passes through a second vertical guide slot 422 also formed in back support portion 200 of seat shell 14. Guide slots 420, 422 are positioned to lie in spaced-apart parallel relation to one another. The first and second arms of handle bar 418 are coupled to harness-control panel 180 and are formed to reciprocate up and down within the guide slots relative to back support portion. Belt support bar 212 is coupled at either end to each of the first and second arms of handle bar 418. Belt support bar 212 is horizontally movable relative to handle bar 418 in and out of slots 222, 224, 226, and 228 of vertical bar anchor member 220. Belt support bar 212 and handle bar 418 are movable vertically along vertical bar anchor member 220 when belt support bar 212 is not received within any of the guide slots 222, 224, 226, and 228. Shoulder straps 142, 144 are positioned to engage with belt support bar 212 so that as belt support bar 212 moves along vertical bar anchor member 220, the height of shoulder straps 142, 144 and harness-control panel 180 are adjusted. Seat assembly 410 further includes a rear shoulder belt clip 414 secured to both shoulder belts 142, 144. Rear shoulder belt clip 414 is also secured to lower belt 146 of seat assembly 410.

Although the invention has been described in detail with reference to certain preferred embodiments, variations and modifications exist within the scope and spirit of the invention as described and defined in the following claims.

What is claimed is:

1. A seat assembly suitable for supporting a child in various recline positions on a vehicle seat, the assembly comprising:

a base having a body and a recline support coupled to the body, the recline support defining a plurality of adjustable positions, a seat having a top portion and a seat portion, the seat portion pivotally and detachably coupled to the base, the seat having a seat shell and a release mechanism coupled to the seat shell, and the seat shell being coupled to the base to be pivotable about an axis relative to the base, and the release mechanism being configured to engage the recline support at one of the adjustable positions.

2. The assembly of claim 1, wherein the seat shell includes a bottom seat portion, a back support portion coupled to the bottom seat portion and positioned to lie at an angle to the bottom seat portion, and first and second side walls each coupled to the bottom seat portion and the back support portion and positioned to lie in spaced-apart relation to each other, and further wherein the release mechanism includes a release rod coupled to and positioned to lie between the first and second side walls of the seat shell, a release handle coupled to the release rod and positioned to lie between the first and second side walls of the seat shell, and a spring coupled to the release rod and the seat shell in order to bias the release rod into engagement with the recline support.

3. The assembly of claim 2, wherein the release mechanism is movable between a lock position where the release rod is engaged with the recline support and a release position where the release rod is spaced-apart from the recline support to allow the seat to pivot about the axis.

4. The assembly of claim 3, wherein the movement of the release mechanism between the lock position and the release position causes the release rod to move along another axis perpendicular to the axis about which the seat pivots.

5. The assembly of claim 4, wherein the axis about which the seat pivots is defined by a mounting rod coupled to the base and the seat shell.

6. The assembly of claim 3, wherein the release handle and release rod of the release mechanism are moved in a direction generally away from the back support portion of the seat shell when the release mechanism is moved to the release position.

7. The assembly of claim 2, wherein the recline support of the base is formed to include teeth forming detents and recesses defining the adjustable positions and the release rod of the release mechanism is formed to be received within any one of the recesses when the release mechanism is in the lock position.

8. The assembly of claim 2, wherein the release handle is formed to include a guide portion and a grip portion coupled to the guide portion, the guide portion is formed to include an aperture for receiving the release rod therein and is further formed to include a pair of "L-shaped" members each positioned to form a channel therebetween, and also wherein the seat shell is further formed to include a guide post coupled to an inside surface of each side wall so that one guide post is received within each channel of the release handle in order to guide the release handle during movement of the release mechanism between the lock and release positions.

9. The assembly of claim 8, wherein the grip portion of the release handle is formed to include a front wall, a back wall, side walls, and a top wall to define a cavity for receiving a user's hand therein.

10. The assembly of claim 2, wherein the release mechanism is formed to include another spring coupled to the release rod and the seat shell.

11. The assembly of claim 10, wherein the release rod includes a pair of outer ends spaced-apart from each other and each spring includes a first spring end and a second spring end and wherein the first spring end of each spring is coupled to one of the outer ends of the release rod and the second spring end of the each spring is coupled to one of the first and second side walls of the seat shell.

12. The assembly of claim 2, further including a mounting rod formed to extend through an aperture formed in the base and an aperture formed in the seat shell, and wherein the release rod of the release mechanism is formed to move in a direction generally perpendicular to the mounting rod between a lock position and a release position in order to allow the seat to pivot about the mounting rod in order to move the seat between an upright position and a variety of reclined positions.

13. The assembly of claim 12, wherein the adjustable positions of the recline support are defined by a first, second, and third recess each formed to receive the release rod therein when the seat is in a reclined position, a partially-reclined position, and an upright position, respectively.

14. The assembly of claim 2, further including a mounting rod formed to extend through an aperture formed in the base and an aperture formed in the seat shell and wherein the base includes a tab normally biased to a lock position to retain the mounting rod within the base and the seat shell.

15. The assembly of claim 14, wherein the mounting rod is removable from the base and the seat shell when the tab is moved to a release position, and further wherein the seat is removable from the base when the mounting rod is removed from the base and the seat shell.

16. The assembly of claim 1, wherein the base is formed to include another recline support coupled to the body of the base and also formed to define a plurality of adjustable positions, and wherein the two recline supports are positioned to lie in spaced-apart relation to one another.

17. The assembly of claim 16, wherein the adjustable portions of each recline support are defined by a first, second, and third detent and wherein the seat is in a fully-reclined position when the release mechanism is received within the first recess, a partially-reclined position when the release mechanism is received within the second recess, and a generally upright position when the release mechanism is received within the third recess.

18. The assembly of claim 1, wherein the seat is further formed to include a recline arm pivotally coupled to the seat shell, the recline arm being movable between a fully retracted position and a fully extended position.

19. The assembly of claim 18, wherein the recline arm is formed to include a generally horizontal bar and a leg coupled to the bar at a first end of the leg and the seat shell at a second end of the leg and formed to extend generally perpendicular to the bar.

20. The assembly of claim 19, wherein the leg is formed to include a first slot and a second slot and wherein the seat shell further includes a pin formed to be received within the first slot and a tab portion formed to be received within the second slot when the recline arm is in the fully extended position.

21. The assembly of claim 19, wherein the recline arm is formed to include another leg having a first end coupled to the bar of the recline arm and a second end coupled to the seat shell, and wherein each leg of the recline arm forms a first slot and a second slot at the second end and further wherein the seat is formed to include a pin received within the first slot of each leg about which each leg rotates and a tab portion formed to be received within the second slot of each leg in order to lock the recline arm in the fully extended position.

22. A seat assembly for restraining a child on a vehicle seat, the assembly comprising
   a base having a body portion and a pair of recline supports coupled to the body portion and positioned to lie in spaced-apart relation to one another, each recline support being formed to include a set of detents and recesses defining a plurality of adjustable positions,
   a seat shell pivotally and detachably coupled to the base, and
   a release mechanism coupled to the seat shell and configured to be received within the recesses of the recline supports of the base, the release mechanism including an engaging element, a spring coupled to the engaging element and the seat shell, and a release handle coupled to the engaging element and positioned to lie at a front end of the seat shell.

23. The seat assembly of claim 22, wherein the seat shell is detachably coupled to the base so that a seat of the assembly, including the seat shell and the release mechanism, is removable from the base.

24. The seat assembly of claim 23, wherein the seat further includes a recline arm pivotally coupled to the seat shell, the recline arm is movable between a fully retracted position and a fully extended position, and wherein the recline arm is in the fully retracted position when the seat is coupled to the base.

25. The seat assembly of claim 24, wherein the seat shell is further formed to include a pair of stationary tab portions and the recline arm is formed to include a generally horizontal bar having outer ends and a first leg and a second leg each coupled to one outer end of the bar at a first end and to the seat shell at a second end, and further wherein each leg forms a first slot and a second slot, each second slot being formed to receive one of the tab portions of the seat shell in order to lock the recline arm in the fully extended position.

26. The seat assembly of claim 22, wherein the seat assembly further includes a mounting rod formed to extend through an aperture formed in the body portion of the base and an aperture formed in the seat shell, and wherein the seat shell is pivotable about the mounting rod relative to the base in order to move the seat between an upright position and a fully reclined position.

27. The seat assembly of claim 26, wherein the mounting rod is removable from the base and the seat shell in order to remove the seat shell and the release mechanism coupled to the seat shell from the base.

28. The seat assembly of claim 27, wherein the base is further formed to include a notch coupled to the body of the base for receiving the mounting rod therein and a locking tab coupled to the notch, and further wherein the locking tab is movable between a normally raised position where the mounting rod is locked to the base and the seat shell and a depressed position where the mounting rod is removable from the base and the seat shell.

29. The seat assembly of claim 28, wherein the mounting rod is slidably movable relative to the seat and the base when the locking tab of the base is in the depressed position.

30. The seat assembly of claim 27, wherein the seat assembly further includes a recline arm pivotally coupled to the seat shell and movable between a fully retracted position and a fully extended position and wherein the recline arm is in the fully retracted position when the seat shell is coupled to the base and is movable to the fully extended position when the seat shell is removed from the base.

31. The seat assembly of claim 22, wherein the seat shell includes a bottom seat portion, a back support portion coupled to the bottom seat portion and positioned to lie at an angle to the bottom seat portion, and first and second side walls each coupled to the bottom seat portion and the back support portion and positioned to lie in spaced-apart relation to each other, and further wherein the engaging element is defined by a release rod coupled to and positioned to lie between the first and second side walls of the seat shell.

32. The seat assembly of claim 31, wherein the release rod of the release mechanism includes a first end and a second end spaced-apart from the first end and coupled to the second side wall of the seat shell, and the release mechanism further includes another spring, and each spring is coupled to one of the first and second ends of the release rod and the corresponding first and second side wall of the seat shell.

33. The seat assembly of claim 32, wherein the release handle of the release mechanism is positioned to lie between the first and second side walls of the seat shell.

34. The seat assembly of claim 22, wherein the body of the base is formed to include a recessed portion positioned to lie at a front end of the base and formed to receive the release handle of the release mechanism therein.

35. The seat assembly of claim 34, further including a mounting rod formed to extend through an aperture formed in the base and an aperture formed in the seat shell, and wherein the body of the base is further formed to include a front wall, a back wall, side walls coupled to and positioned to extend between the front wall and the back wall, and a partition coupled to the side walls and positioned to lie between the front wall and the back wall and wherein the partition forms an aperture for receiving the mounting rod therein.

36. A seat assembly for supporting a child, the assembly comprising
   a base formed to include a body, a first support coupled to the body, and a second support coupled to the body and positioned to lie in spaced-apart relation to the first support, the first and second supports defining selected positions of a seat shell relative to the base, the seat shell detachably coupled to the base, and
   a release mechanism coupled to the seat shell and configured to selectively engage the supports of the base, the release mechanism including a release element, a release handle coupled to the release element, spring means configured to bias the release element of the release mechanism into engagement with the first and second supports.

37. The assembly of claim 36, wherein the assembly further includes a mounting rod coupled to and positioned to extend through both the seat shell and the base and wherein the seat shell is pivotable about the mounting rod relative to the base.

38. The assembly of claim 37, wherein the base further includes a locking tab coupled to the body of the base and formed to move between a normally raised position and a depressed position and wherein the seat shell is disengagable from the base when the locking tab is in the depressed position and the mounting rod is slidably removed from the seat shell and the base.

39. The assembly of claim 37, wherein the release mechanism is movable between a lock position where the release element is engaged with the first and second supports of the base and a release position where the release element is disengaged from the first and second supports of the base, and further wherein the spring means is defined by a first and second spring each coupled to the release element and the seat shell and formed to normally bias the release mechanism to the lock position, and finally wherein the seat shell is pivotable about the mounting rod when the release mechanism is in the release position.

40. The assembly of claim 36, wherein the first and second supports of the base are formed to include a plurality of detents and recesses and the spring means normally biases the release element of the release mechanism to engage one of the recesses of each of the first and second supports.

41. The assembly of claim 40, wherein the first and second supports each include a first, second, and third recess so that the first recess corresponds to a fully reclined position of the seat shell, the second recess corresponds to a partially reclined position of the seat shell, and the third recess corresponds to a generally upright position of the seat shell relative to the base.

42. The assembly of claim 36, wherein the seat shell and release mechanism are pivotally and detachably coupled to the base.

43. A seat assembly for restraining a child on a vehicle seat, the assembly comprising a base having a body portion and a pair of recline supports coupled to the body portion and positioned to lie in spaced-apart relation to one another, each recline support being formed to include a set of detents and recesses defining a plurality of adjustable positions, wherein the body of the base is formed to include a back wall, a front wall, side walls coupled to the front and back walls and positioned to lie in spaced-apart relation to one another, a partition coupled to the side walls and positioned to lie between the front wall and the back wall, and a floor coupled to the front wall, back wall, side walls, and partition in order to form a cavity defined by the floor, partition, side walls, and back wall, and further wherein the base further includes a lid pivotally coupled to the partition in order to enclose the cavity a seat shell pivotally coupled to the base, and a release mechanism coupled to the seat shell and configured to be received within the recesses of the recline supports of the base, the release mechanism including an engaging element, a spring coupled to the engaging element and the seat shell, and a release handle coupled to the engaging element and positioned to lie at a front end of the seat shell.

* * * * *